Oct. 23, 1962 R. E. FARRELL ETAL 3,059,580
POWER STEERING PUMP
Filed Dec. 29, 1959

INVENTORS.
Robert E. Farrell
Christopher Nuss.
BY Harness & Harris
ATTORNEYS.

United States Patent Office 3,059,580
Patented Oct. 23, 1962

3,059,580
POWER STEERING PUMP
Robert E. Farrell, Royal Oak, and Christopher Nuss, Roseville, Mich., assignors to Chrysler Corporation, Highland Park, Mich., a corporation of Delaware
Filed Dec. 29, 1959, Ser. No. 862,713
3 Claims. (Cl. 103—42)

This invention relates to fluid actuated power steering for automotive vehicles and in particular to an engine driven pump and metering flow control valve effective to discharge fluid at a metered rate to a fluid actuated motor for a steering mechanism.

It has been common heretofore to provide a flow control valve which is responsive to the fluid pressure developed by the pump to open a bypass circuit for the power steering motor when the pump pressure exceeds a predetermined value. Thus the fluid pressure supplied to the motor remains substantially constant for any pump speed, which in turn is determined by the engine speed. The valve is provided with a metering port which discharges to the power steering motor to actuate the same. By maintainnig the pump pressure at the high pressure side of the metering port substantially constant, the rate of fluid flow to the steering motor is maintained substantially constant.

In practice, the valve is spring loaded to maintain the bypass closed until the pump discharge pressure exceeds the pressure at the low pressure side of the metering port by a predetermined desired differential. This pressure differential is also applied to the valve to shift the latter against its loading spring and progressively open the bypass as the pressure differential increases above said predetermined value. In consequence, the pressure of the metered fluid flow through the valve metering port gradually increases with increasing engine speed. During steering operation of the vehicle, however, the pressure and rate of fluid flow required progressively decrease with increasing vehicle speed, the maximum fluid power being required at low speeds, as for example during parking maneuvers.

It is accordingly an important object of the present invention to provide an improved power steering pump and flow control valve which preserves all the desirable characteristics of simplicity and economy of a customary preferred type of structure, yet enables fluid discharge through the metering port at a progressively smaller pressure as the pump speed and its output pressure increase beyond predetermined desired limits.

Another and more specific object is to provide an improved flow control valve of the above type which effects a bypass conduit of restricted cross sectional area and a comparatively high velocity bypass flow at the region of the restriction. The metering port for the valve opens into the bypass conduit at the restricted region of high velocity bypass flow to receive pressurized fluid therefrom to operate the power steering motor.

By virtue of this construction, the greater the pressure differential between the pump outlet and inlet, the greater will be the velocity of the bypass fluid flow and the less will be the static fluid pressure causing fluid flow through the metering port to the power steering motor. In consequence, during high speed operation of the vehicle, the pressure operating the power steering motor is materially reduced, thereby to minimize heating of the fluid and wear and stress on the pump and steering motor. At low vehicle speeds, as for example during parking when the pump is operated at low speed and its outlet pressure is reduced, the pump bypass is closed and the metering port is open to substantially the full static pressure developed by the pump, whereby the fluid power delivered to the power steering motor is an optimum.

Other objects of this invention will appear in the following description and appended claims, reference being had to the accompanying drawings forming a part of this specification wherein like reference characters designate corresponding parts in the several views.

Figure 1:
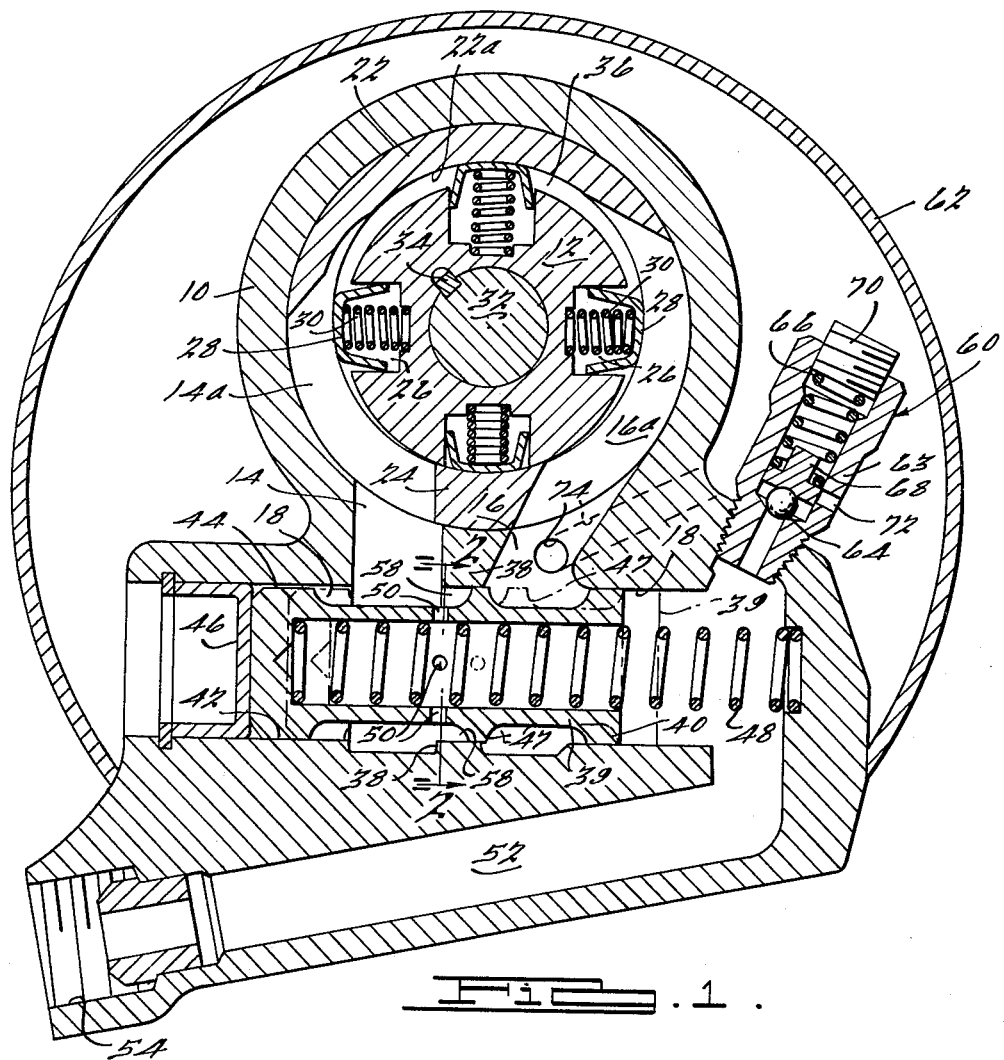
FIGURE 1 is a schematic sectional view through the rotor and flow control valve of a power steering fluid supply system embodying the present invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a power steering fluid supply system for an automotive vehicle is illustrated by way of example comprising a pump housing having a cylindrical rotor housing portion 10 for a coaxial rotor 12 and communicating by way of outlet and inlet chambers 14 and 16 respectively with a cylindrical valve chamber 18 in a lower base portion 20 of the pump housing. The rotor housing 10 is provided with a sleeve insert having diametrically opposed pumping and sealing elements 22 and 24 spaced circumferentially by outlet and inlet chambers 14a and 16a which extend circumferentially within housing 10 around rotor 12 and communicate with chambers 14 and 16 respectively.

The rotor 12 is provided with a plurality of recesses 26, each containing a radially inwardly opening cup-shaped slipper 28 urged radially outward by a spring 30 under compression between the interior surface of the slipper 28 and the base of the corresponding recess 26. An engine driven drive shaft 32 is suitably keyed at 34 to the rotor 12 to rotate the latter counterclockwise as indicated by the arrow proportionately to engine speed.

The upper pumping element 22 of the sleeve insert is provided with an inner cylindrical pumping surface 22a coaxial with the rotor 12 and spaced therefrom to provide a pumping chamber 36. The circumferential extent of the inner surface 22a is approximately equal to or slightly greater than the effective circumferential spacing between successive slippers 28, i.e., between the trailing edge of each slipper 28 and the leading edge of the next successive slipper 28, so that each slipper in turn will seal the pumping chamber 36 from the inlet 16a approximately simultaneously with or slightly before the opening of pumping chamber 36 to the outlet 14a by the next preceding slipper 18.

The sealing element 24 of the sleeve insert is provided with an inner circumferential surface adjacent and coaxial with rotor 12 to effect a fluid seal therewith when no slipper 28 engages the portion 24. The outer circumferences of the elements 22 and 24 are in press fit fluid sealing contact with the juxtaposed portions of the rotor housing 10, the sealing element 24 engaging a juxtaposed portion of a fixed land 38 of the pump housing which separates the outlet and inlet chambers 14 and 12. The cylindrical inner surface of land 38 comprises a central wall portion of the cylindrical valve chamber 18.

The operation of the pump described thus far is conventional and is only described briefly herein. Shaft 32 and rotor 12 are rotated counterclockwise in FIGURE 1 at a speed proportional to engine speed. Fluid enters chamber 36 from chamber 16a behind each slipper 28 in turn. Fluid in advance of each slipper 28 in pumping chamber 36 is driven leftward to develop the pump pressure in chambers 14a and 14. Before each slipper leaves the leftward end of chamber 36, the next successive slipper enters the rightward end of chamber 36, so that leakage or back flow into chamber 16a is prevented. Likewise the seal between rotor 12 and the inner cylindrical surface of element 24 prevents undesired loss of pump pressure from chamber 14a to chamber 16a.

Slidable axially within the valve chamber 18 is a generally tubular spool valve 39 closed at its left end in FIGURE 1. The right end of valve 39 is provided with a radially enlarged cylindrical sealing land 40 in fluid sealing contact with the cylindrical wall of the valve chamber 18 to separate the inlet chamber from the comparatively high pressure metered flow as described below. The left end of valve 39 is provided with a generally cylindrical radially enlarged guide land 42 having a flat surface portion 44 effective to enable fluid flow from outlet 14 to the closed left end of valve 39, thereby to urge the latter to the right with a force determined generally by the pump discharge pressure, as explained below. Leftward of land 42, valve chamber 18 is closed by a sealing plug 46 which also serves as a movement limiting stop for leftward movement of valve 39.

In the central region of the spool valve 39 is a cylindrical bypass land 47 which makes fluid sealing engagement with the cylindrical inner surface of chamber 18 at the region of housing land 38 when valve 39 is shifted leftward to the bypass closing position illustrated. The diameter of the spool between lands 42 and 47 and also between lands 40 and 47 is reduced as illustrated. Also at the regions of communication between valve chamber 18 and chambers 14 and 16, i.e., between the cylindrical surface of housing land 38, which engages spool land 47, and the cylindrical surfaces of valve chamber 18 which engage lands 40 and 42 respectively, the interior of valve chamber 18 is enlarged annularly as illustrated to provide free access to the pressurized pump discharge fluid entirely around spool valve 39 between lands 42 and 47, and to provide free access to the pump inlet fluid entirely around spool valve 39 between lands 40 and 47.

Valve 39 is yieldingly urged to the left against the stop 46 by means of a coil spring 48 under compression within the valve 39 between a radially inner shoulder of the latter and the right sidewall of pump housing portion 20. The interior of valve 39 communicates with pump outlet chamber 14 by means of a plurality of restricted metering passages 50 located adjacent and at the high pressure side of land 47 as explained below. The right end of valve 39 opens into a discharge passage 52 formed in housing portion 20 and having a discharge end 54 adapted for connection with the fluid supply system of a power steering motor.

During operation of the pump at engine idling speed for example and correspondingly at low rotational speed for rotor 12 and low pump discharge pressure in outlet 14, valve 39 is at its leftward position illustrated with the radial ports confronting the high pressure inlet conduit 14. When engine speed increases and the pressure in chamber 14 approaches a predetermined limiting value in consequence of the increased speed of rotation of pump rotor 12, the fluid discharge pressure communicated to the left end of valve 39 via flat 44 urges the valve 39 rightward against the tension of spring 48 until land 47 is moved rightward out of engagement with housing land 38. In consequence, a bypass flow is established between outlet chamber 14 and inlet chamber 16 to prevent excessive buildup of pump pressure with increasing engine speed.

Metering ports 50 are determined in size and located with respect to outlet 14 so that at approximately the limiting pressure at which the bypass opens between outlet 14 and inlet 16, the flow of pump discharge fluid converging radially inwardly toward valve 39 and ports 50 at the entrance to the bypass will result in a comparatively large pressure drop across ports 50 to effect a predetermined flow in conduit 52 to the power steering motor which will amount to between approximately 1.7 and 2 gallons per minute. Such a volume of flow at the resulting pressure in the neighborhood of 1000 p.s.i. is adequate and is required during low speed operation of the vehicle, as for example during parking. However, as the vehicle speed and pump output pressure increase, the power required for steering decreases. Without provision to the contrary, the pressure in conduit 52 would be excessive at high speed operation of the vehicle and would cause undue wearing of the fluid actuated parts involved.

In order to avoid such an occurrence, the cylindrical inner surface of housing land 38 is extended leftward in FIGURE 1 to a position adjacent and preferably overlapping at least a portion of metering ports 50 when valve 39 is at its extreme leftward position. Thus when valve 39 is shifted rightward by the pump outlet pressure to open the bypass between the outlet and inlet chambers 14 and 16, at least a major portion of the metering ports 50 and preferably the entirety thereof will open into an annular restricted region 58 of the bypass.

Figure 2:
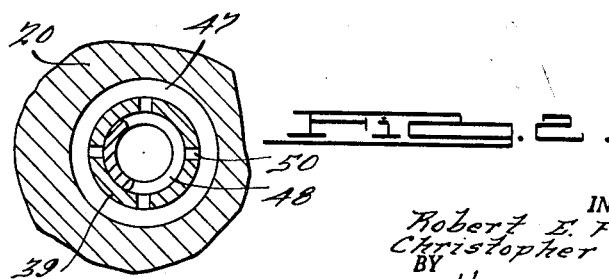
FIGURE 2 is a fragmentary sectional view taken in the direction of the arrows substantially along the line of 2—2 of FIGURE 1.

The radial dimension of land 47 is determined so that the cross sectional area of annular restriction 58, as seen in FIGURE 2, is small in comparison with the cross sectional area of outlet chamber 14 at the region of its opening into valve chamber 18. Accordingly the fluid velocity of the bypass flow through restriction 58 will be appreciably greater than the velocity of fluid flow in chamber 14 and in consequence, as the pump pressure increases in outlet chamber 14, the static fluid pressure in the restriction 58 will drop appreciably below the static fluid pressure in outlet chamber 14.

In accordance with the structure described, during high speed operation of the engine when bypass land 47 is shifted rightward to its open position, phantom position, FIGURE 1, metering ports 50 will open into a region of comparatively low static fluid pressure and will be substantially perpendicular to the velocity flow. Prior to opening of the bypass, the static fluid pressure within the restriction 58 will be substantially equal to the static fluid pressure in chamber 14. Thus the ratio of the static fluid pressure in restriction 58 urging fluid flow through metering ports 50 to the static fluid pressure in the comparatively larger cross sectional area of chamber 14 will be less at high engine speed when the bypass land 47 is shifted rightward to the open position than at lower engine speeds prior to opening of the bypass.

In the above regard, it is to be noted that by virtue of the velocity of fluid flow in annular restriction 58, the angular disposition of the ports 50 in valve 39 and the shape of their fluid entry and exit portions is important to the pressure drop thereacross. The ports 50 illustrated extend through the sidewall of spool valve 39 perpendicularly to the latter's axis and have sharp right angle edges at their entry and exit ends. By reason of the sharply defined entry openings for the ports 50, for example, a minimum fluid flow therethrough results for any given static pressure drop thereacross, particularly when ports 50 are close to conduit 14 to receive the velocity pressure therefrom. Also the arrangement of the axes of the ports 50 substantially perpendicularly to the direction of fluid flow in restriction 58 enables only a slight component of the latter's fluid velocity pressure to the effective to force fluid through the ports 50. By extending the ports 50 obliquely to the axis of valve 39 so as to open in directions angularly downstream into the restriction 58, the velocity pressure effect can be reduced, as compared with the structure shown. On the other hand, by arranging the ports 50 so as to open in directions angularly upstream into restriction 58, a pronounced Pitot effect will result and the velocity pressure forcing fluid through ports 50 will be increased, as compared to the structure shown. By suitably determining the cross sectional area of the restriction 58 and the shape, location and angular disposition of the metering ports 50, the resulting pressure within conduit 52 can be progressively reduced as desired as the bypass progressively opens.

A pressure relief valve 60 is provided which normally closes communication between passage 52 and a reservoir 62 enclosing the pump mechanism. Valve 60 comprises a tubular body 63 having one end screwed into a threaded bore in housing portion 20 which opens into conduit 52. A check ball 64 seats at the base of an enlargement of the bore of body 63 and is yieldingly urged to the seated position shown by a coil spring 66 under compression between a spring seat 68 and a plug 70 which closes the outer end of tubular housing 63, the spring seat 68 being seated against the outer circumference of check ball 64.

In the event of an excessive pressure buildup in duct 52, ball 64 is unseated to permit fluid flow into reservoir 62 via port 72 in the sidewall of tubular body 63. Communication between the interior of reservoir 62 and inlet chamber 16 is provided by duct 74 in housing portion 20, which opens at the annular enlargement of valve chamber 18 between sealing lands 40 and 47. A fluid return flow from the power steering motor enters reservoir 62 by means not shown.

We claim:

1. In a device for supplying a vehicle power steering gear with pressurized fluid, a pump having inlet and discharge ports, a valve chamber intersected by said ports and having an intermediate cylindrical part spacing said ports, said discharge port opening into said chamber transversely to the axis of said cylindrical part, a hollow valve element shiftable axially within said cylindrical part and having a land in fluid sealing engagement with said cylindrical part to block communication between said ports when said element is at a closed position, said element being reduced on the pump discharge port side of said land to provide an axially extending bypass conduit located between said cylindrical part and element and adapted to connect said ports to direct an axial bypass flow therebetween when said element is shifted in one axial direction from said discharge port toward said inlet port to move said land to an open position axially beyond said cylindrical part, means yieldingly urging said element in the direction opposite said one direction to a limit of closing movement whereat said element is at said closed position, a metering port extending transversely of said axis through the sidewall of the reduced portion of said element, a portion of said metering port when said element is at said limit of closing movement being located axially beyond said bypass conduit whereat the fluid flow converging toward the entrance of said bypass conduit and toward said element and metering port appreciably increases the effective pressure drop across said metering port with respect to the pressure drop thereacross when the latter is in the region of said axial bypass flow, said metering port being in the region of said axial bypass flow when said land is at said open position, and means responsive to the fluid discharge pressure of said pump for urging said element in said one direction to said open position.

2. In a device for supplying a vehicle power steering gear with pressurized fluid, a pump having inlet and discharge ports, a valve chamber intersected by said ports and having an intermediate cylindrical part spacing said ports, said discharge port opening into said chamber transversely to the axis of said cylindrical part, an annular valve element shiftable axially within said cylindrical part and having an annular land in fluid sealing engagement with said cylindrical part to block communication between said ports when said element is at a closed position, said element being reduced on the pump discharge port side of said land to provide an axially extending annular bypass conduit located between said cylindrical part and element and adapted to connect said ports to direct an axial bypass flow therebetween when said element is shifted in one axial direction from said discharge port toward said inlet port to move said land to an open position axially beyond said cylindrical part, said bypass conduit being restricted in cross sectional area to effect a comparatively high velocity to said axial bypass flow when said land is at said open position, means yieldingly urging said element in the direction opposite said one direction to a limit of closing movement whereat said element is at said closed position, a metering port extending radially through the sidewall of the reduced portion of said element, a portion of said metering port when said element is at said limit of closing movement opening into said discharge port whereat the fluid flow converging toward the entrance of said bypass conduit and toward said element and metering port appreciably increases the effective pressure drop across said metering port with respect to the pressure drop thereacross when the latter is in the region of said highspeed axial bypass flow, said metering port being in said region of axial bypass flow when said land is at said open position, and means responsive to the fluid discharge pressure of said pump for urging said element in said one direction to said open position.

3. In a fluid pressure supply system, a pump having inlet and discharge ports, a valve chamber intersected by said ports and having a sealing part spacing said ports, a valve element shiftable within said chamber and having a land in fluid sealing engagement with said sealing part to block communication between said ports when said element is at a closed position, said element being spaced from said sealing part on the pump discharge port side of said land to provide a bypass conduit adapted to connect said ports to direct an axial bypass flow therebetween when said element is shifted in one direction from said discharge port towards said inlet port to move said land to an open position beyond said sealing part, said bypass conduit being restricted in cross sectional area to effect a comparatively high velocity to said axial bypass flow when said land is at said open position, means yieldingly urging said element in the direction opposite said one direction to a limit of closing movement at said closed position, a metering port extending through said element transversely of said bypass conduit, said metering port when said element is at said limit of closing movement having a portion opening into said discharge port whereat the fluid flow converging toward the entrance of said bypass conduit and toward said element and metering port appreciably increases the effective pressure drop across said metering port with respect to the pressure drop thereacross when the latter is in the region of said high speed axial bypass flow, said metering port being in said region of axial bypass flow when said land is at said open position, and means responsive to the fluid discharge pressure of said pump for urging said element to said open position.

References Cited in the file of this patent

UNITED STATES PATENTS

| 2,724,335 | Eames | Nov. 22, 1955 |
| 2,739,538 | Witchger | Mar. 27, 1956 |
| 2,752,853 | Eames | July 3, 1956 |
| 2,977,888 | Livermore | Apr. 4, 1961 |
| 2,003,423 | Drutchas | Oct. 10, 1961 |